United States Patent [19]

Werjefelt

[11] Patent Number: 4,461,155
[45] Date of Patent: Jul. 24, 1984

[54] AIRCRAFT CABIN VENTILATION SYSTEM

[76] Inventor: Bertil Werjefelt, 277 Kaha St., Kailua, Hi. 96734

[21] Appl. No.: 185,962

[22] Filed: Sep. 10, 1980

Related U.S. Application Data

[63] Continuation-in-part of Ser. No. 073,612, Sep. 10, 1979, Pat. No. 4,437,318.

[51] Int. Cl.³ .............................................. F25D 17/06
[52] U.S. Cl. .......................................... 62/93; 62/78; 250/432 R; 250/492.1
[58] Field of Search .................. 62/91, 92, 93, 97, 78, 62/264; 250/432 R, 492.1

[56] References Cited

U.S. PATENT DOCUMENTS

| | | | |
|---|---|---|---|
| 1,844,420 | 2/1932 | Buttolph | 250/492.1 |
| 1,863,576 | 6/1932 | Morse et al. | 62/93 |
| 1,866,346 | 7/1932 | Clark | 62/93 |
| 2,017,027 | 10/1935 | Forrest | 62/92 |
| 2,150,263 | 3/1939 | Chesney | 250/492.1 |
| 2,479,766 | 8/1949 | Mulvaney | 244/1 R |
| 2,485,522 | 10/1949 | Anderson | 62/150 |
| 2,496,862 | 2/1950 | Delmar | 98/1.5 |
| 2,805,344 | 9/1957 | Matelsky | 250/432 R |
| 2,835,340 | 5/1958 | McGuff et al. | 62/93 |
| 3,042,383 | 7/1960 | Pennington | 62/91 |
| 3,269,801 | 8/1966 | Boberg et al. | 23/288 |
| 3,377,941 | 4/1968 | Jaremus | 62/264 |
| 4,018,060 | 4/1977 | Kinsell et al. | 62/91 |

FOREIGN PATENT DOCUMENTS 8300 of 1910 United Kingdom ............. 250/492.1

Primary Examiner—Ronald C. Capossela
Attorney, Agent, or Firm—Sandler & Greenblum

[57] ABSTRACT

An aircraft cabin humidification system for humidifying an air mass within the cabin. The system comprises:
 (a) means for ventilating the cabin with a ram air stream;
 (b) means for humidifying the air of the ram air stream so as to maintain a desired level of humidity within the cabin;
 (c) means for exhausting at least a portion of said air from the cabin;
 (d) removal means for at least partially removing moisture from the air removed from the cabin;
 (e) recycle means for recycling at least a portion of the moisture from the exhausted air; and
 (f) humidification means for humidifying the cabin by adding at least a portion of the removed moisture to the cabin.

A method for ventilating an aircraft cabin comprising the steps of:
 (a) injecting ram air into the cabin;
 (b) humidifying the ram air by injecting moisture therein;
 (c) exhausting air from said cabin;
 (d) removing moisture from the exhausted air of step (c);
 (e) recycling the removed moisture of step (d); and
 (f) reinjecting the removed moisture into the ram air.

A method of reducing the ozone level of a gas comprising the step of irradiating the gas at a frequency of about 253.7 nm.

28 Claims, 3 Drawing Figures

AIRCRAFT CABIN VENTILATION SYSTEM

CROSS REFERENCE TO RELATED APPLICATIONS

This application is a continuation-in-part application of Application Ser. No. 73,612 filed on Sept. 10, 1979, now U.S. Pat. No. 4,437,318 issued Mar. 20, 1984 the disclosure of which is hereby incorporated by reference.

BACKGROUND OF THE INVENTION

1. Field of the Invention

The present invention relates to air quality control method and apparatus for conditioning air on board aircraft and the like.

2. Description of the Prior Art

The prior art relating to internal aircraft conditions and the control thereof is well documented in aviation medical journals, aviation engineering journals, government aviation regulations and popular aviation magazines. Two publications of particular interest which discuss the basic principles and prior art in the field are "Fundamentals of Aircraft Environmental Control" by Alvin Ebeling (1968), Haiden Book Co., Inc., New York and "Aircraft Humidification System Development" by P. F. Halfpenny, Lockheed California Company. A major problem in cabin air quality control on board aircraft relates to the loss of moisture which escapes with air from inside the aircraft during high altitude flight. This problem is often compounded by the presence of an excess of ozone, pathogens, odors, and other contaminants which permeate the air on board the aircraft.

Prior to the advent of commercial jet aviation, the problem of retaining moisture on aircraft was less pronounced than it is today. Such aircraft flew at lower altitudes whereat the atmosphere has a higher moisture content.

In modern systems, the principal method of maintaining acceptable moisture levels is by means of an evaporation system whereby water is evaporated into the internal ambient air. Excess water is carried on board for this specific purpose. However, such systems have proved only marginally effective. Using such systems to provide about 30 to 50% relative humidity, requires large volumes of water. Furthermore, such water leaves salt residues upon evaporation, resulting in the introduction of dust into the cabin, thereby providing unsatisfactory results.

In another system presently in use, sprays of very fine water mist at ambient temperatures are injected into the cockpit and cabin area. In such systems the water source is limited to on-board supplies of potable water.

While the aircraft itself may be loaded with sufficient water to humidify the cabin air over the entire voyage, such a procedure would entail loading large amounts of water onto the aircraft, thus adding substantially to its weight. The additional weight of the aircraft quite obviously increases its fuel consumption and reduces available commercial space on the aircraft. Therefore, in the rare instances where aircraft are humidified by an evaporation system, no special water supplies are carried and portions of the drinking water are diverted for this purpose.

Since relatively little moisture is commonly injected into the low humidity air circulated throughout the aircraft in conventional systems, natural evaporation and expiration from the occupants contributes substantially to the on board relative humidity. With jet-propelled commercial aircraft commonly in use, flight durations may range from less than one and up to about 14 hours primarily at flight levels of 18,000 feet to 40,000 feet and in some instances as high as 50,000 feet. At these altitudes, the maximum possible moisture content in the ambient air is less than 1/20th that of the air at sea level. It can, therefore, be shown that approximately 95% of on board humidity on present day commercial aircraft takes the form of perpiration and expiration from the occupants themselves.

In order to provide some semblance of humidification on board aircraft, fresh air ventilation rates on board aircraft have been on the order of 15-20 cubic feet of fresh air per minute per person (cfmp). In some cases, the fresh air ventilation rates are even as low as 5 cubic feet per minute per person. By using such low fresh air ventilation rates, moisture generated by the occupants themselves is the major contributor to the humidification of the cabin air. Ventilation rates of 15-20 cfmp provide for less than a 10% relative humidity level. Thus, although fresh air ventilation rates in other enclosed areas such as restaurants and the like are on the order of 40 or 50 cubic feet per minute per person, the considerably lower ventilation rates on board commercial aircraft have been used as a compromise method for providing additional humidity.

In addition to providing for stale air conditions, such a low percentage of relative humidity is very unacceptable since the majority of travelers are accustomed to relative humidities on the order of approximately 50%.

Other factors prompting the recirculation of air within the aircraft rather than continuous ventilation with fresh air from exterior of the aircraft are the inherent ozone problems which occur, especially at higher altitudes and on most flights in the northern latitudes during winter and spring. Thus, when outside air is constantly drawn in, increased levels of ozone result on board the aircraft. Methods proposed for controlling the amount of ozone introduced into the aircraft have included charcoal filters. Such filters were investigated and subsequently abandoned owing to their inefficiency and unacceptable bulk. Most recently, a ceramic metal matrix catalytic converter installed in the high temperature, high pressure bleed air lines have been used. While such converters may prove useful at high temperatures and pressures, they are ineffective under less extreme conditions thus limiting the air intake to the bleed lines taken off of the turbine compressors.

In such systems, high air ventilation rates are very expensive since such rates are conventionally achieved at the expense of increased fuel consumption since the fresh air used is taken off of the turbine compressors.

Owing to the arid nature of the air on board the aircraft, a very uncomfortable situation developes. Not only is there considerable inconvenience caused through irritation of the mucous membranes, but such conditions also affect the skin and aggravate certain existing medical and health problems. Additionally, owing to the temporary, in some cases prolonged, dehydration and incapacitation of mucous membranes and other tissues and follicles, such conditions occasionally reduce resistance to harmful bacteria by people who would otherwise have had adequate defense mechanisms for defending against such microorganisms. Low relative humidity renders the defensive mechanisms of the body in the nasal passage and upper respiratory tract and the eye less effective in resisting infection.

Yet another problem, which would occur even if low fresh air ventilation rates were acceptable, results from the leakage which naturally occurs out of the cabin. Although ideally aircraft cabins should be sealed, leakage naturally occurs thereby further complicating the problem of aircraft humidification. Since it is impractical to recover moisture from uncontrolled aircraft leakage it must be considered that such moisture is effectively lost and must somehow be replenished if the aircraft occupants are to be subjected to an atmosphere having a comfortable relative humidity.

Finally, another disadvantage of prior systems operating with low fresh air-ventilation is the tendency of such systems to develop undesireably high concentrations of carbon dioxide within the cabin.

FIG. 1 describes the current state of the art wherein cold air 1 is fed into the aircraft structure 9. The cold dry air 1 is heated at 6 becoming warm dry air 3 and is then fed into the passenger cargo compartment 8 where it mixes with retained moisture or injected vapor 5 and becomes warm moist air, subsequently leaving the internal passenger cargo compartment 8 and the aircraft 9 as warm moist air. In such systems, the exhausted air is often recycled although not shown in the drawings.

In a similar prior art embodiment (not shown) water is brought on board the aircraft for the specific purpose of prolonging the retention of moisture on board the aircraft. In such an embodiment, cold dry air 1 is allowed to enter aircraft 9, the air becomes warm dry air 3 and is fed into the passenger cargo compartment 8 where it encounters water vapor 5 and becomes warm moist air 4. An additional heat source such as a boiler (not shown) may be used to vaporize the liquid stored on board so as to produce warm moist air 4. As was previously the case, the warm moist air 4 is exhausted from the internal passenger cargo compartment 8 and out of the aircraft 9 as warm moist air 4 while fresh dry air fed into the cabin must constantly be humidified with the limited available supply of water.

Because of relatively limited water supplies, the procedures described in the two previous embodiments lead to the problem of too much arid air in the passenger cargo compartment.

SUMMARY OF THE INVENTION

It is, therefore, an object of the invention to provide a humidification system for providing comfortable levels of relative humidity on board aircraft.

It is a further object of the invention to provide for a system involving increased fresh air ventilation rates thus reducing the staleness of the aircraft cabin atmosphere.

It is yet another object of the invention to provide an ozone treatment system which reduces the harmful and undesireable effects of ozone.

These and other objectives are fulfilled by the process and apparatus of the invention in which an aircraft cabin humidification system for humidifying a fresh air mass in an aircraft cabin is provided.

The humidification system of the invention may be used as part of an overall aircraft cabin humidification system for humidifying an air mass within an aircraft cabin. Such a system comprising means for ventilating the cabin with a ram air stream; and means for humidifying the air of the ram air stream so as to maintain a desired level of humidity within the cabin. Means for removing at least a portion of the air from the cabin; and removal means for at least partially removing moisture from the air removed from the cabin are also provided. A recycle means is used to recycle at least a portion of the moisture from the exhausted air; while humidification means for humidifying the cabin by adding at least a portion of the removed moisture to the cabin also make up the system.

The system may further comprise means for reducing the ozone level within the ram air. The means for reducing the ozone level in the ram air comprises irradiation means for irradiating the ram air at a frequency of 253.7 nm. Once again, means for monitoring contaminant and means for purifying the moisture being recycled from the exhaust air may be used. Although not necessary, the system may also include means for injecting bleed air into the cabin. Means may be provided for mixing the ram air and bleed air prior to injection into the cabin. The recycled moisture may be reinjected into the ram air with nozzle means prior to entry into the cabin. The ram and bleed air may be mixed in a plenum chamber prior to being fed into the chain. Again, the recycled moisture may be purified with purification means for purifying the recycled moisture.

An overall treatment method is likewise provided according to the invention. In this method, ram air is injected into the cabin; and the ram air is humidified by injecting moisture therein. Air is exhausted from the cabin. Moisture is removed from the air being exhausted. The removed moisture is recycled and reinjected into fresh ram air. The ozone level of the ram air may be reduced by irradiation at a frequency of 253.7 nm. If desired substantially all of the air may be exhausted from the cabin to the exterior. The moisture may be removed from the exhausted air by cooling the air to below the dew point of the moisture. The air being introduced into the cabin may be ram air or ram air blended with bleed air from the turbines of the jet aircraft. The recycled moisture may be injected into the ram air prior to its entry into the cabin. The recycled moisture may be introduced into the ram air prior to irradiation.

According to the invention, the use of irradiation as a means of reducing ozone levels is preferred. Such irradiation is performed at a frequency of 253.7 nm. The gas may be humidified prior to irradiation. Such irradiation may be performed in metal container such as may be made out of brass with the gas being irradiated as it passes therethrough. The container may be provided with a tortuous gas passage. For purposes of the invention the gas being irradiated is air. According to another aspect of the invention, heated air onboard the aircraft is cooled by heat exchange with the aircraft skin. The aircraft skin itself is cooled as the aircraft flies. In one embodiment the heated air is passed thru a tube in direct contact with the aircraft skin.

BRIEF DESCRIPTION OF THE DRAWINGS

With reference to the annexed drawings.

DESCRIPTION OF PREFERRED EMBODIMENTS

Figure 1:
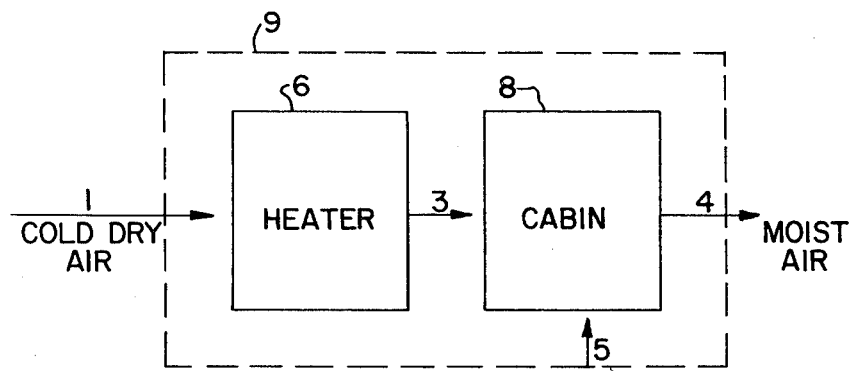
FIG. 1 is a schematic diagram illustrating the prior art.

In general terms, the invention relates to a method and apparatus for recovering moisture from air on board aircraft prior to exhausting the air overboard. The moisture is purified, such as by an ozone or other treatment and optionally sterilized prior to being introduced into the cabin.

It has been surprisingly found that by radiation at a frequency of about 253.7 nm, substantial removal of ozone at cabin temperature and pressure may be achieved. This ozone reduction technique makes it possible to use ram air streams at high altitudes which would otherwise normally introduce unsafe levels of ozone if ventilated through conventional catalytic converters which do not operate at low temperatures and pressures. By using ram air, increased ventilation rates more closely approximating desirable levels may be economically achieved.

Additionally, even when flying at low altitudes, the moisture in the air prior to entry into the cabin, may be disinfected germicidally by means of radiation at 253.7 nm, although other disinfection means may be applied. In this instance the irradiation techniques are not used to reduce ozone levels but rather for purposes of disinfecting the air.

In order to provide for the higher ventilation rates proposed by the inventor than those commercially used, although other systems may be used, a preferred system according to the invention comprises the use of ram air in combination with bleed air which is now in conventional use. Ram air is defined as air drawn in directly from the exterior of the aircraft, normally at a temperature of $-70°$ F. which is brought into the aircraft through openings in the fuselage itself. In conventional systems, ram air is used only as a coolant for bleed air coming off of the turbines which exits at temperatures between 300°–600° F. In such systems, there is no direct contact between both streams of air; and the ram air is not used for ventilation. According to the invention, ram air is used for ventilation and is mixed with bleed air, thus allowing for the higher ventilation rates desired without substantially increasing the use of bleed air together with its inherent expense. When ram air is used sudden pressurization of the air will result in the air being heated. To cool the air, it may be brought into contact with the aircraft skin, such as by passing it into contact with the skin of the aircraft wing and or fuselage. Quite obviously other conventional heat exchange means may be used.

Two alternative methods may be used for purposes of mixing the two streams of air. First, a venturi valve system may be used in which bleed air is used to aspirate ram air into the ventilation system of the aircraft. Alternatively, the bleed air may be injected into a plenum and mixed with ram air likewise injected into the plenum so as to provide a stream of controlled properly pressurized air for ventilation through the cabin.

The difference in temperatures between the two streams as well as the differing pressure considerations, may, obviously, require the use of additional heating and pressure control means for supplying the outlet stream containing both the ram and bleed air into the cabin under controlled conditions.

Leakage is an additional consideration which must be taken into account by means of the method and apparatus of the invention. At low ventilation rates, it is common to observe that uncontrolled aircraft leakage may exceed 50%. Since it may not be practical to recapture moisture from uncontrolled aircraft leakage, the ultimate efficiency of the method and apparatus disclosed herein are strongly dependent upon the percentage rate of uncontrolled aircraft leakage. Thus, if the relative percentage of uncontrolled aircraft leakage can be kept to a minimum relative to overall ventilated air, the efficiency of the inventive system can be very high. At low uncontrolled leakage situations using moisture recapture and recirculation, evaporation of perspiration and expiration prove sufficient to provide satisfactory relative humidity.

Two principal methods may be employed for remedying the negative influence of uncontrolled aircraft leakage. First, increased ventilation, as noted above, while maintaining constant cabin pressure, results in a reduction of aircraft leakage relative to the total amount of air being circulated. Second, in addition to reducing the relative aircraft leakage, although sealing of the cabin is practically a very difficult and imperfect procedure, the provision of non-humidified air to the principal uncontrolled aircraft leakage areas such as restrooms and the like further significantly reduces leakage of moisture out of these areas. In those instances where leakage proves significant, such as through drainage ports and the like, appropriate seals or valves may obviously be used to further reduce losses.

As was noted above, the amount of bleed air used may be reduced if a mixture of ram air and bleed air is introduced into the cabin. While from a practical standpoint, the mixture of the two air streams has always been possible, recent airline regulations require that airline operators limit the amount of ozone contamination on board aircraft thus inherently drastically limiting the use of ram air. Bleed air is used instead since its high temperatures and pressures make it more suitable for catalytic treatment.

According to the invention this problem is overcome by an ozone removal technique in which air being fed to the cabin is irradiated at 253.7 nm. prior to entry into the aircraft. According to a preferred embodiment of the invention, irradiation ia achieved by passing the ozone contaminated air through an appropriate container in which the air is irradiated with a radiation of the above frequency. Such a system has the advantage of light weight and that it may be operated at ambient pressures and temperatures.

As was noted previously an essential part of the invention is the recapture of moisture from the on board air supply prior to exhausting the air stream overboard. While a wide variety of techniques may be used to accomplish this aim, one possible technique is the mixture of this stream with a cold temperature air stream, such as may be obtained from outside the aircraft. Assuming that the on board air being exhausted has a relative humidity of about 50%, laboratory tests have confirmed that near instantaneous growth of small aerosol droplets having a size of less than about one micron, to about 15–20 microns in size occurs. These larger droplets may then be captured in a conventional coalescing filter of the types commonly used in aircraft. Such filters are normally used for purposes of removing moisture from incoming air when the moisture level is excessive, e.g., in high pressure bleed lines. Such coalescing filters have an efficiency of up to about 90%.

Instead of directly contacting the cool and escaping air, according to another technique, the two air streams may be indirectly contacted through a heat exchange system. According to this technique, a cooling apparatus is provided in which cold outside air, or for that matter any other cooled fluid, is circulated in contact with the inside of the external aircraft skin. The exhausted air stream is passed through the cooling apparatus and its temperature is lowered by virtue of the cold temperature of the the cold air or fluid in the apparatus. Quite obviously, rather than direct heat exchange between the cooling fluid and the humidified air leaving the aircraft, an intermediate heat exchange fluid may be used. As a modification of this technique, the cooling apparatus may be slowly revolved so as to allow a portion of the exchanger to pass through a heating cycle at all times. Thus, moisture is accumulated on the cool surface of the cooling apparatus as it is cooled by the outside air stream and is removed in the form of a liquid as the apparatus passes through a warming cycle. In such a system three quadrants can be maintained in the cooling area while one quadrant is maintained in the heating area. According to another technique, an apparatus having a continuous cooling cycle revolving radiator and an external heating means in the form of microwave or other suitable radiation, may be used. Instead of heating means, mechanical means may be provided for removing accumulated moisture off of the cold surfaces.

An additional advantage of the invention is that by virtue of the fact that most vaporized contaminants present on board an aircraft such as, e.g., alcohol, do not, because of their relatively low dew points accumulate in the moisture recovery system. This results in a condensed liquid which is somewhat cleaner than the air from which it was removed.

It is anticipated that most particulate matter will escape with the dried air from the aircraft. However, since certain kinds of gasses such as cigarrette smoke have a tendency to bind themselves with the water being collected, supplemental filtration and treatment systems may be necessary. In addition to conventional fluid filtration means, ozone purification may additionally be used for purposes of germicidally treating the liquid. Ozone may be provided by means of a small electrically operated irradiation device of the type now used in aquariums for water purification purposes.

In the course of purifying the captured moisture, it may be desired to provide a small reservoir having a capacity on the order of approximately 100 liters for a wide bodied jet. Such a reservoir may be provided with an expandable bladder for accomodating variable water levels.

Such a reservoir serves two functions. First, by definition, the reservoir acts as a sump for the collected liquid prior to its reinjection into the stream being fed to the cabin. In addition, while merely storing the water, the sump provides necessary dwell-time for purification of the water. It is believed that a dwell-time on the order of about 10 minutes is sufficient to accomplish complete purification and satisfactory attenuation of ozone.

Moisture captured from the escaping cabin air may be reintroduced into the inlet stream by a variety of different techniques. Preferably, one of the following two techniques is used. According to the first technique, a pump operating at a sufficiently high pressure is used to inject the liquid into the inlet stream. Obviously, sufficiently high pressures must be used to overcome the pressure within the line itself. According to another preferred technique, a venturi valve is installed in the inlet stream for purposes of facilitating the suction of the fluid into the inlet line.

When using a pump to inject the liquid, the liquid may be injected through any one of a variety of conventionally available liquid injection nozzles. The nozzles used serve to finely divide the moisture thus faciliating its evaporation. Quite obviously, when injecting into the bleed air stream, since this line runs at a temperature of about 300°–600° and since this liquid will ultimately be cooled such as, for example, by means of contact with the cold ram air, the amount of fluid being injected must be metered so as not to inject too much liquid into the stream which would then result in the liquid precipitating out upon contact with the cold air. The liquid used to humidify the aircraft also assists in heat exchange, thereby assisting in the efficient temperature reduction of the high temperature bleed air. Thus, in addition to humidifying the air, the injection of liquid further cools the air.

Figure 2:
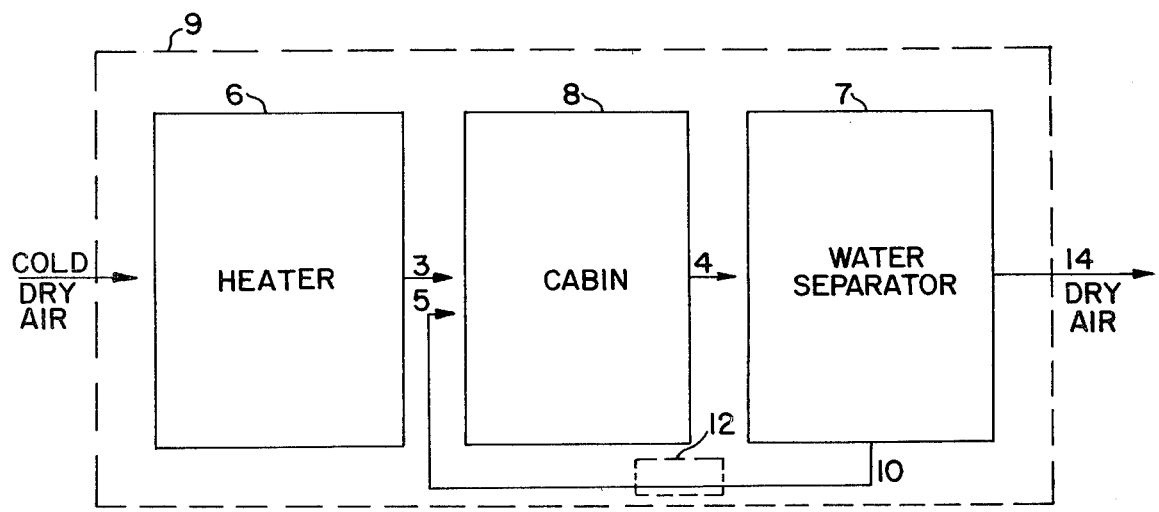
FIG. 2 is a schematic diagram illustrating the inventive system.

Referring now to FIG. 2, a preferred embodiment of the basic invention is schematically described wherein cold air 1 is allowed to enter the aircraft 9 and is then heated at 6 so as to become warm dry air 3 prior to entering the passenger cargo compartment 8 where it mixes with the water vapor 5 becoming warm moist air 4. The term "heating" is used only relatively to indicate that the air fed to the cabin is warmer than the outside air. In practice, several heating and cooling stages may be used. Prior to being exhausted from this compartment, at least a portion of the warm moist air 4, as is noted in FIG. 2, is passed through a moisture separator such as a cooling source 7 whereby separation, condensation, or crystallization of moisture occurs. At least a portion of the water is recirculated through line 10 to an optional heating source 12 which vaporizes the condensed moisture. In the process, dry air 14 is exhausted from the passenger cargo compartment and from the aircraft 9. Although the dehumidification and humidification may occur within the passenger compartment 8, it is of course obvious that dehumidification can occur in any suitable location within the aircraft 9 with the ultimate intention of providing the desired moisture content in the passenger compartment 8.

In addition to providing a more comfortable atmosphere, increased humidity on board the aircraft is believed to further reduce some of the undesireable effects normally associated with ozone.

Figure 3:
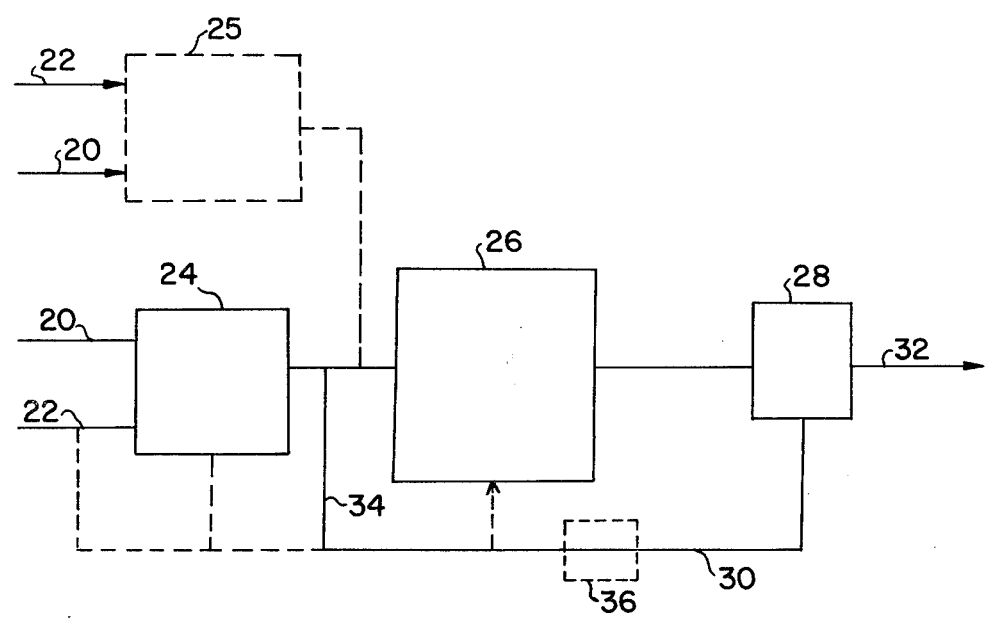
FIG. 3 schematically illustrates a preferred overall ventilation system according to the invention.

As may be seen from FIG. 3, the dehumidification system of the invention finds particular application in the context of a complete aircraft cabin environmental control system. Bleed air 20 as well as ram air 22 are both injected into the system for ventilating the aircraft. The relative amounts of each of the streams may be varied as a function of cost as well as the ultimate conditions desired in the aircraft. As was noted previously, where at all possible, ram air is preferably used since it is less expensive than bleed air. As shown in FIG. 3 both streams are led into a a plenum or mixing chamber 24. Alternatively, a venturi-valve 25 shown in dashed lines in FIG. 3 can be used to facilitate suction of the ram air into the system and to mix the bleed and ram air streams, as described above. Although such a system is illustrated, an alternative system (not shown) in which the two air streams are mixed by introducing one stream into the other may also be used in which case the plenum 24 is no longer necessary. The mixed stream is fed into the aircraft cabin 26. Moisture removed from the exhausted ventilation air is injected so as to humidify the air within the cabin. Such injection may occur into the plenum chamber directly, into the steam between the plenum chamber and the cabin (as shown), or for that matter injection directly into the cabin itself. As was noted in connection with FIG. 2, a heater 36 may be provided for purposes of vaporizing the moisture if this moisture is to be introduced in the form of a vapor rather than as discrete liquid droplets. Besides injection at any of the points noted previously, injection may likewise take place directly into the bleed line into the system. The humidified air leaving the cabin 26 includes not only the moisture reinjected into the system but further contains moisture generated by the passengers themselves. All, or if desired only a portion, of the air exhausted out of the aircraft is passed through a moisture separator 28. This moisture separator removes as much moisture as possible so that the moisture can be recycled through stream 30. Dry air in stream 32 then leaves the aircraft.

Although the invention has been described with respect to various particular maeans and embodiments, it is to be understood that the invention is not limited to those means specifically disclosed but extends, instead, to all obvious equivalents and modifications thereof.

Thus, cool ambient air being fed to the cabin may undergo a single or a plurality of heating and cooling cycles prior to entering the aircraft when depending upon the circumstances.

Furthermore, although the invention has been specifically described with repsect to a cooling means for cooling the air prior to its exhaust from the cabin for purposes of lowering its due point, it is to be understood that any and all other means for removingmoisture from the air may be used. Thus, silica gel as well as electrostatic precipatators or molecular sieves may be used. Furthermore, refrigeration techniques alone or in combination with centrifugation and other means may quite obviously be used for removing the moisture from the air. Additionally, besides humidifying the air by injecting the moisture therein, it is likewise possible to pass the air through a container filled with the captured water. In such cases, the air used may be bleed air taken off of the turbine of the aircraft and fed directly through the container prior to being mixed with the ram air or to being admitted into the cabin.

Finally, although it is an advantage of the invention that fresh air is constantly being fed into the cabin, the invention does not preclude the partial recirculation of cabin air under conditions which nevertheless provide the necessary ventilation and humidification rates.

What is claimed is:

1. An aircraft cabin humidification system for humidifying an air mass within said cabin said system comprising:
   (a) replacement means for ventilating said cabin with a ram air stream;
   (b) means for exhausting at least a portion of said air from said cabin;
   (c) removal means for at least partially removing moisture from said air exhausted from said cabin;
   (d) recycle means for recycling at least a portion of said moisture from said exhausted air; and
   (e) humidification means for humidifying said cabin by adding at least a portion of said recycled moisture to said cabin.

2. The aircraft cabin humidification system as defined by claim 1 further comprising means for reducing the ozone level within said ram air.

3. The aircraft cabin humidification system as defined by claim 2 wherein said means for reducing the ozone level in said ram air comprises irradiation means for irradiating said ram air at a frequency of about 253.7 nm.

4. The aircraft cabin humidification system as defined by claim 3 wherein said irradiation means includes a metal container in which said ram air is irradiated.

5. The aircraft cabin humidification system as defined by claim 4 comprising purification means for purifying said moisture being recycled.

6. The aircraft cabin humidification system as defined by claim 5 further comprising means for injecting bleed air into said cabin.

7. The aircraft cabin humidification system as defined by claim 6 comprising means for mixing said ram air and bleed air prior to injection into said cabin.

8. The apparatus as defined by claim 7 comprising nozzle means for injecting said recycled moisture into said ram air prior to entry into said cabin.

9. The apparatus as defined by claim 8 further comprising a plenum chamber for mixing said ram air and bleed air.

10. The aircraft cabin humidification system as defined by claim 4 wherein said metal container includes brass.

11. The aircraft cabin humidification system as defined by claim 1 further comprising purification means for purifying said recycled moisture.

12. The method as defined by claim 1 further comprising means for injecting humidified air through portions of said cabin and means for injecting non-humidified air to uncontrolled aircraft leakage areas in said cabin.

13. A method for ventilating an aircraft cabin comprising the steps of:
   (a) injecting ram air into said cabin;
   (b) humidifying said ram air by injecting moisture therein;
   (c) exhausting air from said cabin;
   (d) removing moisture from said exhausted air of step (c);
   (e) recycling said removed moisture of step (d); and
   (f) recycling said removed moisture to provide the moisture injected in step (b).

14. The method as defined by claim 13 further comprising reducing the ozone level of said ram air stream by irradiation at a frequency of 253.7 nm.

15. The method as defined by claim 14 wherein the irradiation is performed in a metal container.

16. The method as defined by claim 15 comprising exhausting substantially all of the air from said cabin to the exterior.

17. The method as defined by claim 16 comprising removing said moisture from said exhausted air by cooling said air to at least the dew point of said moisture.

18. The method as defined by claim 17 comprising further introducing bleed air into said cabin.

19. The method as defined by claim 18 further comprising injecting said recycled moisture into said ram air prior to entry into said cabin.

20. The method as defined by claim 19 further comprising introducing said recycled moisture into said ram air prior to irradiating.

21. The method as defined by claim 15 wherein said metal container includes brass.

22. The method as defined by claim 13 further comprising cooling air heated on the aircraft by heat exchange with said aircraft skin, said aircraft skin being cooled by the ambient air as said aircraft flies.

23. The method as defined by claim 22, wherein said air heated on the aircraft is passed thru a tube in direct contact with said aircraft skin.

24. The method as defined in claim 13 further comprising the steps of:
(a) injecting humidified air into at laest a portion of said cabin; and
(b) injecting non-humidified air into uncontrolled leakage areas in said cabin.

25. An aircraft cabin ventilation system for ventilating the cabin of an aircraft, said system comprising a venturi-valve connected to a bleed air line and to another air line, said venturi-valve being adapted such that said bleed air aspirates air from said other air line through said venturi-valve into said cabin and such that said bleed air and said other air are mixed in said venturi-valve before passing into said cabin.

26. The aircraft cabin ventilation system as defined by claim 25 wherein said other air line is a ram air line.

27. A method for ventilating an aircraft cabin with a combination of bleed and other air, said method comprising the step of passing bleed air through a venturi-valve such that said other air is aspirated through said venturi-valve into said cabin and such that said bleed air and said other air are mixed in said venturi-valve before passing into said cabin.

28. The method as defined by claim 27 wherein said other air line is a ram air line.

* * * * *